United States Patent [19]

Simmonds

[11] 4,401,285
[45] Aug. 30, 1983

[54] AIRCRAFT UNDERCARRIAGE UNIT

[75] Inventor: John H. J. Simmonds, Kingston-upon-Thames, England

[73] Assignee: British Aerospace Public Limited Company, London, England

[21] Appl. No.: 256,252

[22] Filed: Apr. 21, 1981

[30] Foreign Application Priority Data

Apr. 30, 1980 [GB] United Kingdom ............... 8014207

[51] Int. Cl.³ ..................... B64C 25/50; B64C 25/58
[52] U.S. Cl. ................................ 244/100 R; 244/50; 244/63; 244/104 FP
[58] Field of Search ........... 244/63, 50, 102 R, 100 R, 244/104 R, 104 FP

[56] References Cited

U.S. PATENT DOCUMENTS

| 2,919,933 | 1/1960 | Olson | 244/50 |
| 3,099,424 | 7/1963 | Hrusch | 244/50 |
| 3,155,345 | 11/1964 | Paysen et al. | 244/63 |
| 3,178,132 | 4/1965 | Wood et al. | 244/63 |
| 3,370,811 | 2/1968 | Boody | 244/50 |
| 3,647,164 | 3/1972 | Smith | 244/63 |

Primary Examiner—Galen L. Barefoot
Attorney, Agent, or Firm—Cushman, Darby & Cushman

[57] ABSTRACT

An aircraft undercarriage unit which includes an upper leg member 1 arranged for attachment to an aircraft body 4, a lower leg member 2 in axially slidable association with the upper leg member 1 to form a telescopic shock absorber, ground wheel means 6 carried by the lower leg member 2 and a sleeve member 13 through which the lower member extends and into which the upper leg member 1 may protrude. The sleeve member has anchorage means 17, 18 through which towing loads may be accepted and transmitted respectively.

9 Claims, 7 Drawing Figures

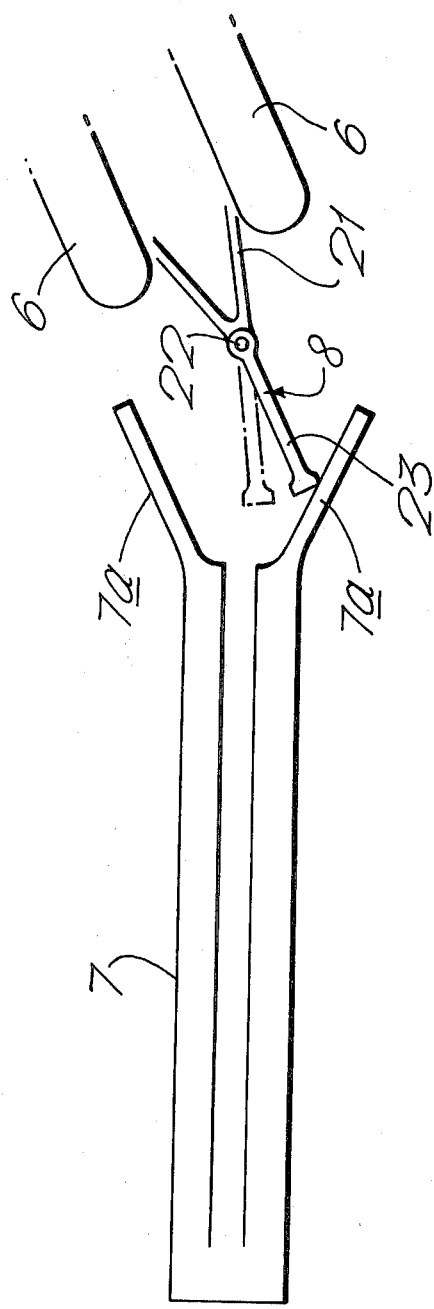

AIRCRAFT UNDERCARRIAGE UNIT

This invention relates to aircraft undercarriage units of the telescopic shock absorbing type.

where towing and/or restraint loads, for example, those very high loads associated with catapult launching are to be accepted and transmitted by such a telescopic undercarriage unit, there are conflicting requirements which include:

(a) The towing and restraint loads are preferably accepted by the unit as near to the ground and at as shallow an angle to the horizontal as possible; by implication this means that the loads are applied to a lower portion rather than an upper fixed portion of the unit, and, (b) it is generally impractical to accept and transmit these loads so low down on the unit since, in a relatively lightweight telescopic shock absorber, it is undesirable to allow the lower portion to transmit bending and shear loads of this magnitude into the upper fixed portion even with the presence of a load transmitting element mounted directly between the lower movable portion and the aircraft structure.

An object of the present invention is to provide an aircraft undercarriage unit which reconciles these requirements without significantly degrading the shock absorbing capability.

A further object is the provision of an undercarriage unit wherein the towing loads are transmitted to the aircraft structure in a relatively direct manner, such that excessive offsets in the load path, with attendant increases in strength and weight in the undercarriage unit, are avoided.

Yet a further object, where the invention relates to a nose undercarriage unit, is the provision of such a unit wherein a steering capability is retained.

According to the present invention, there is provided an aircraft undercarriage unit which includes an upper member arranged to be attached to an aircraft structure, a lower leg member in axially slidable association with the upper leg member to form a telescopic shock absorber, ground wheel means carried by the lower leg member, a sleeve member through which the lower leg member extends and into which the upper leg member may protrude, the sleeve member having anchorage means through which towing loads can be accepted and transmitted. It will be understood that in the just-described arrangement, the major portion of any towing loads are applied to the sleeve member, thereby reducing the bending moment applied to the telescopic shock absorber. Moreover, since the upper leg member may protrude into the sleeve member, the shock absorber may undergo a relatively high degree of contraction.

The aircraft undercarriage unit preferably further includes constraining means which prevent rotation of the sleeve member with respect to the upper leg member.

The lower leg member may advantageously rotate with respect to the upper leg member for steering purposes. In this case, the sleeve member may form a mounting for a steering motor adapted to effect steering movement of the wheel means through suitable drive means.

The sleeve member is preferably fixed axially with respect to the lower leg member.

Preferably the upper leg member and the lower leg member are capable of controlled extension from an unextended position to an extended position. This is of particular advantage when the undercarriage unit is a nose unit of an undercarriage of an aircraft adapted to be catapult launched because it allows the nose of the aircraft to be raised for launch.

Preferably an upper end region of the sleeve member is in sealingly slidable engagement with the upper leg member. This feature serves to isolate at least part of the lower leg member from the external environment.

The sleeve member conveniently further includes anchorage means through which restraint loads are transmitted.

In order to ensure that towing loads are transmitted to the aircraft structure in a relatively direct manner, towing link means and drag strut means may be attached to the sleeve member through which at least the major portion of the towing loads are accepted and transmitted respectively, the lines of force through the towing link means and the drag strut means being coincident when a towing force is applied to the sleeve member.

One embodiment of an aircraft nose undercarriage unit according to the invention is described by way of example with reference to the accompanying drawings in which: FIG. 1 is a side elevation of the unit in an unextended ground engaging position, FIG. 2 is a similar view with the unit in an extended catapult engaging position with catapult means shown for reference.

Figure 1:
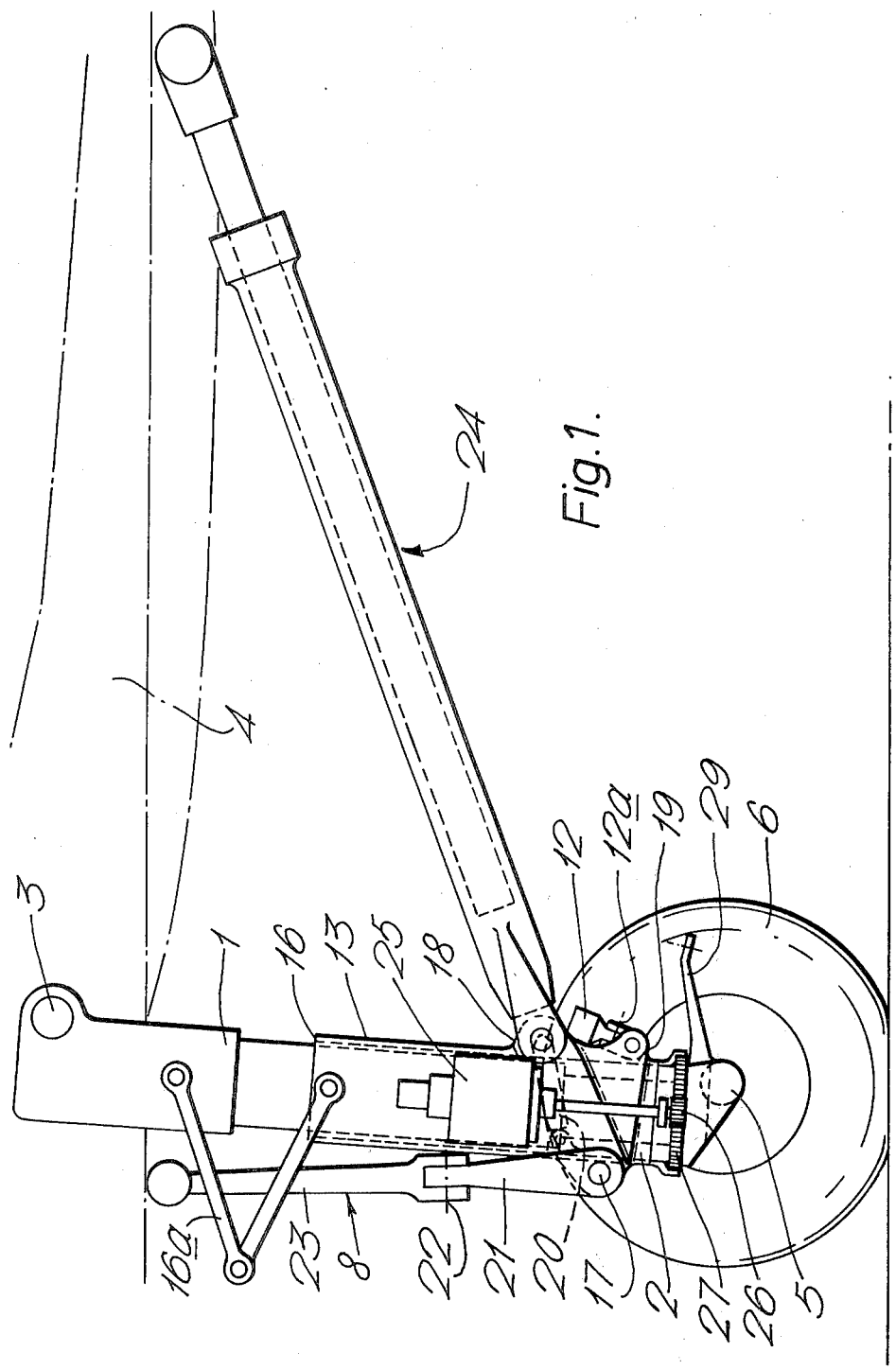

In this specification, reference to disposition of components such as upper, lower, forward or rearward, relates to the undercarriage unit in a ground engaging position.

Referring to the Figures, an aircraft nose undercarriage unit has a telescopic shock absorbing leg formed by an upper leg member 1 and a lower leg member 2. The upper member 1 is pivoted at 3 to an aircraft fuselage structure 4 (denoted in broken outline) whilst the lower member 2 carries an axle 5 on which are mounted twin ground wheels 6.

The upper and lower members respectively include a cylinder and a piston which mutually engage to form the shock absorber of the telescopic shock absorbing leg. To raise the nose of the aircraft, the piston and cylinder can be extended in known manner from the position illustrated in FIG. 1 to that of FIG. 2 and vice versa whilst still retaining the shock absorbing capability. This feature is essential where the aircraft is to be catapult launched, for example, from an aircraft carrier.

To enable the aircraft to be catapult launched by standard United States Navy catapult apparatus, an aircraft nose undercarriage unit requires certain specialised features. To enable these features to be described and to explain just how the present invention relates to those features, a brief description of such catapult apparatus is now given. It comprises a shuttle member 7 which is accelerated from a standstill to aircraft take-off speed (bearing in mind the wind speed over the launch site which is generally the carrier deck) in a short distance. Only the nose undercarriage unit of an aircraft to be launched is coupled to this shuttle. The undercarriage unit is therefore provided with a towing link 8, one end of which is permanently pivotally anchored to the undercarriage unit and the other end of which is temporarily anchored to a forward region of the shuttle member for instant release as the aircraft becomes airborne.

The shuttle member and its associated aircraft are held stationary until a predetermined tension is developed between them and fixed structure 9 associated with the carrier deck. This is arranged by a holdback arrangement 10 which extends between the aircraft undercarriage unit and the fixed structure and which incorporates a tension element 11 arranged to be left behind, and a break-link element 12 carried by the undercarriage unit and locked to the tension element for fracture when the desired catapult tension is developed.

The shuttle is straddled by the twin wheels 6; the latter being guided into the straddle position prior to launch by laterally inclined acquisition members 7a carried by the shuttle; these are engaged by the towing link 8 to effect undercarriage steering in a manner described below.

Since the aircraft is drawn from a standstill to take-off speed within a relatively short distance by the shuttle, naturally the loads transmitted by the towing link 8 into the nose undercarriage unit and from that unit into the aircraft structure are great. Moreover, it is important that these loads enter the undercarriage at a relatively small angle to the horizontal and are passed by as direct a path as possible into the fuselage. Similarly, there should be a relatively direct load path within the undercarriage between the towing link 8 and the break-link element 12.

To enable these criteria to be met, the nose undercarriage unit is provided with a load transmitting sleeve 13. This lies externally of the lower leg member 2 such that the latter extends through it whilst the upper leg member protrudes downwards into it. The sleeve 13 is located with reference to both the upper and the lower leg members by constraining means to be described, such that it moves in the axial sense, that is to say, in the vertical or shock absorbing sense as drawn, with the lower leg member 2 but is free to rotate relatively to it. Furthermore, the constraining means are such that the sleeve is free to slide with reference to the upper leg member 1 as it moves with the lower leg member 2, but is positively prevented from rotation.

Alternatively, in an embodiment not shown, the sleeve is fixed to the upper leg member 1 and is free to slide with reference to the lower leg member 2.

Figure 5:
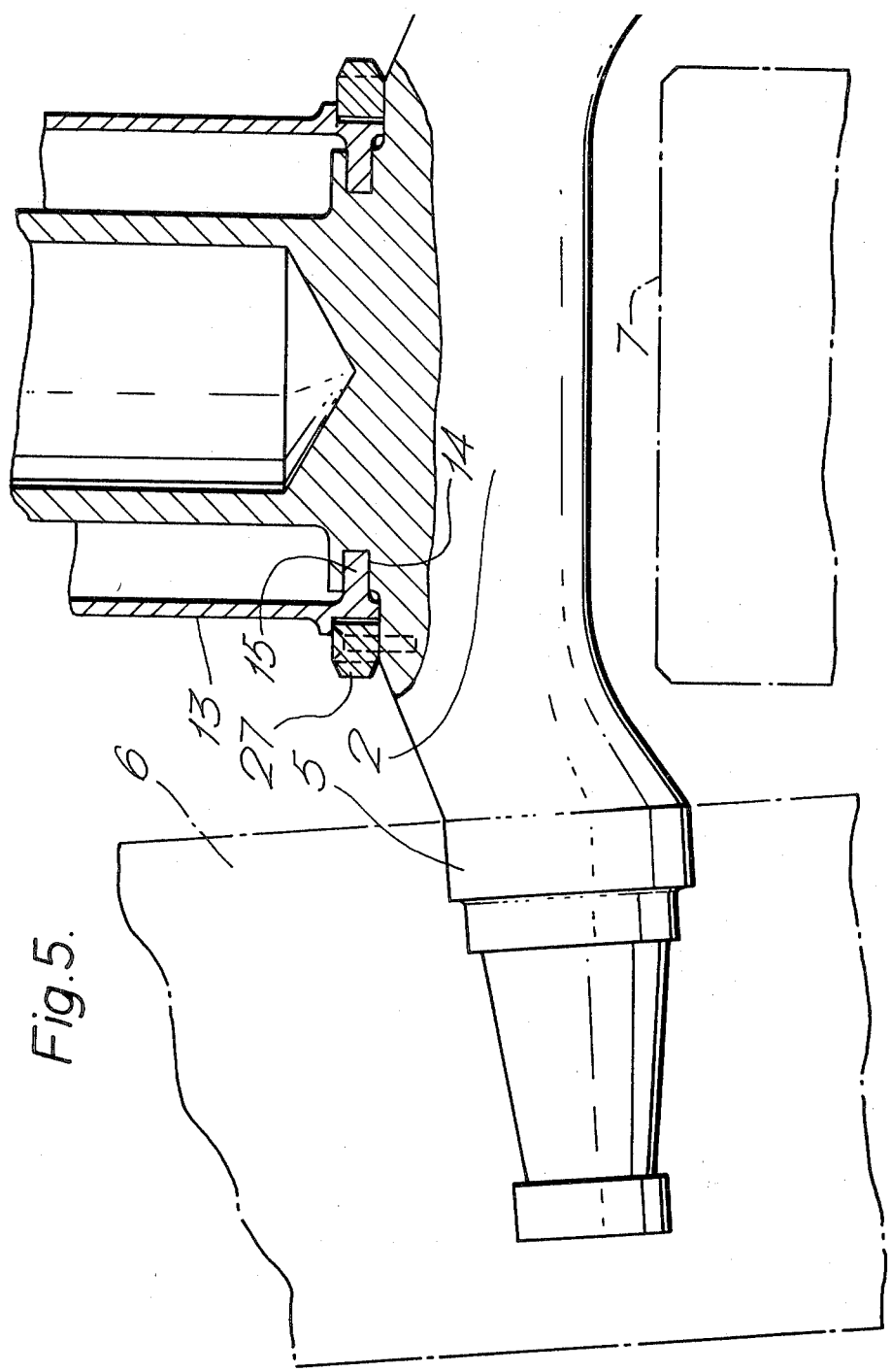
FIG. 5 is a part section in the direction of arrows V—V of FIG. 4.

In the illustrated embodiment, the constraining means at the lower end of the sleeve comprise an outwardly opening circumferential slot 14 with which engages a mating inwardly directed flange 15 formed upon the sleeve 13. This is shown in FIG. 5. At the upper end of the sleeve, the constraining means comprise an annular bearing 16 situated between the sleeve 13 and that portion of the upper leg member protruding therein to maintain radial spacing, and a torque link 16a coupled between the sleeve 13 and the upper leg member 1 to accommodate axial sliding movement but to prevent relative rotation.

The sleeve 13 is formed with anchorage means, through which the various launching loads are accepted and transmitted, which comprise a lug 17 formed upon a forward region, and upper and lower lugs 18 and 19 formed upon a rearward region.

The forward lug 17 has attached to it the towing link 8 for pivotal movement about a horizontal axis between a stowed position in which it is directed upwards to lie generally parallel to the undercarriage leg members as shown in FIG. 1, and a towing position in which it is directed generally downwards at a shallow angle to engage the shuttle 7. Pivotal movement is by means of a jack 20.

Figure 6:
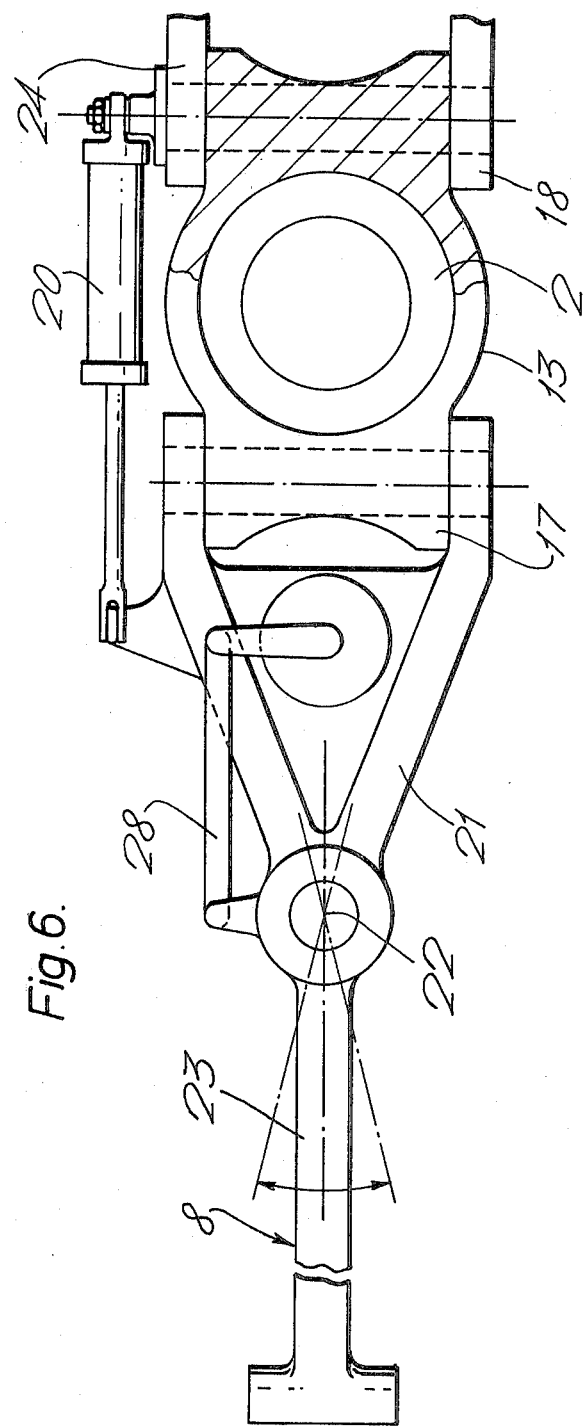
FIG. 6 is a view on the assembly in the general direction of arrow VI of FIG. 4, and, FIG. 7 is a diagrammatic plan view illustrating acquisition of the undercarriage unit by catapult means prior to launch.

The towing link is in two main parts, described particularly with reference to FIG. 6, a triangulated yoke 21 pivoted about the horizontal axis to the lug 17 carrying a pivot 22 normal to the horizontal axis, and a shuttle engagement arm 23 pivoted to the yoke at 22. The arm 23 is thus angularly movable in the lateral sense for shuttle acquisition purposes to the described.

The rearward upper lug 18 has pivotally attached to it, about a horizontal axis, one end of a load transmitting element 24, the other end of the element being pivoted to the fuselage structure. This element acts both as a strut and a tie and is telescopic to accommodate shock absorbing and extension movement of the lower leg member 2 and also undercarriage folding. It incorporates a hydraulic lock to enable it to transmit tension loads and a mechanical stop to enable it to transmit compression loads.

Figure 2:
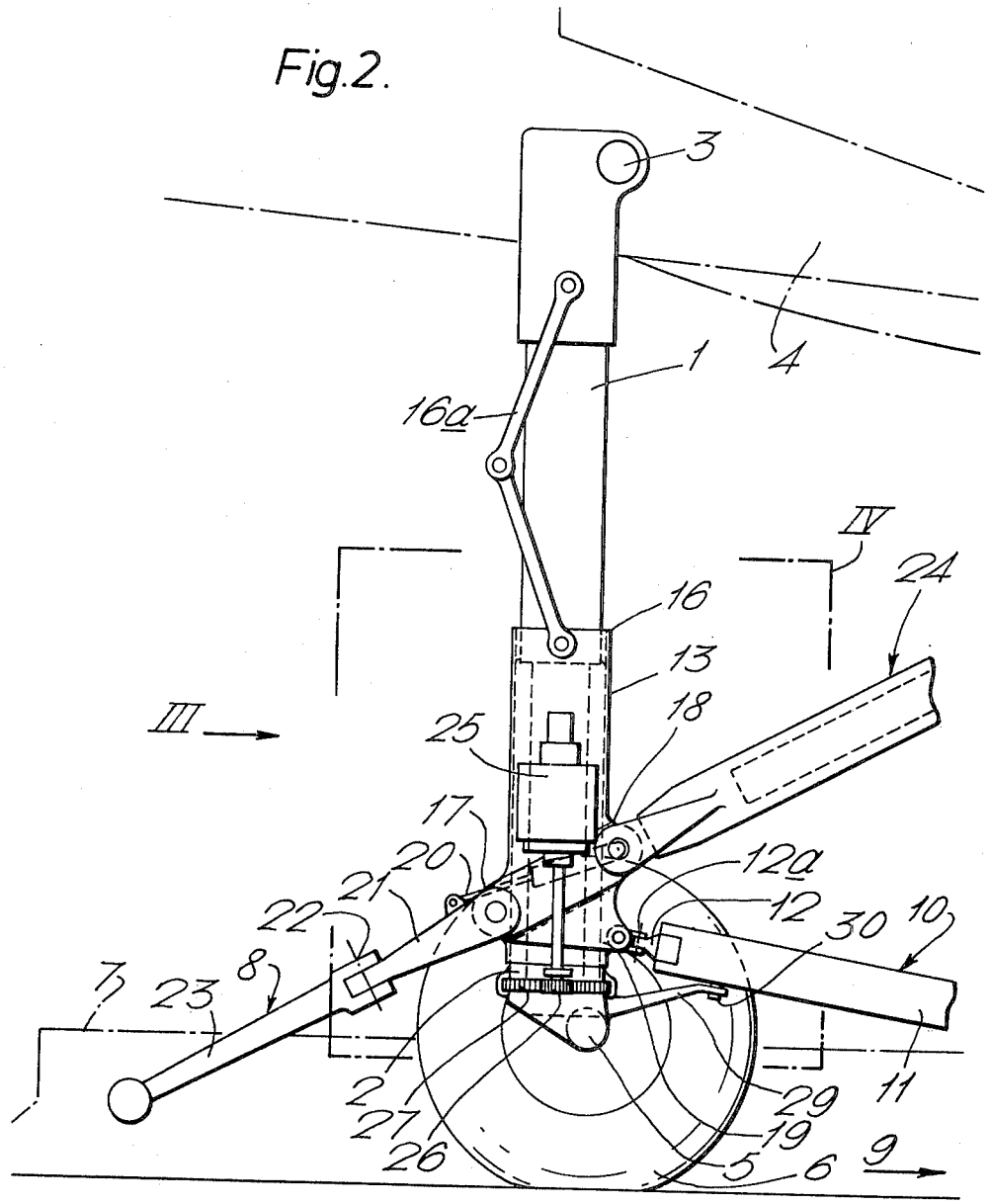
Figure 3:
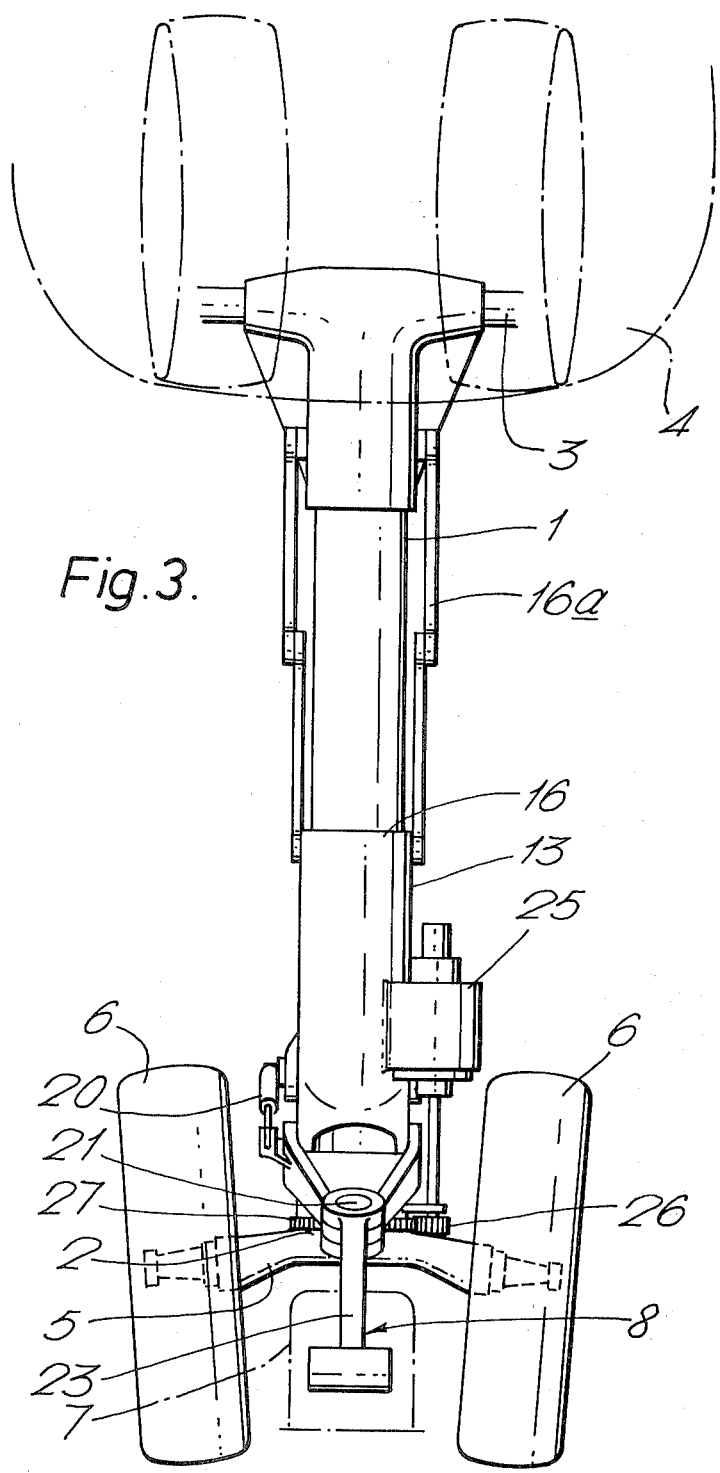
FIG. 3 is a view in the direction of arrow III of FIG. 2.
Figure 4:
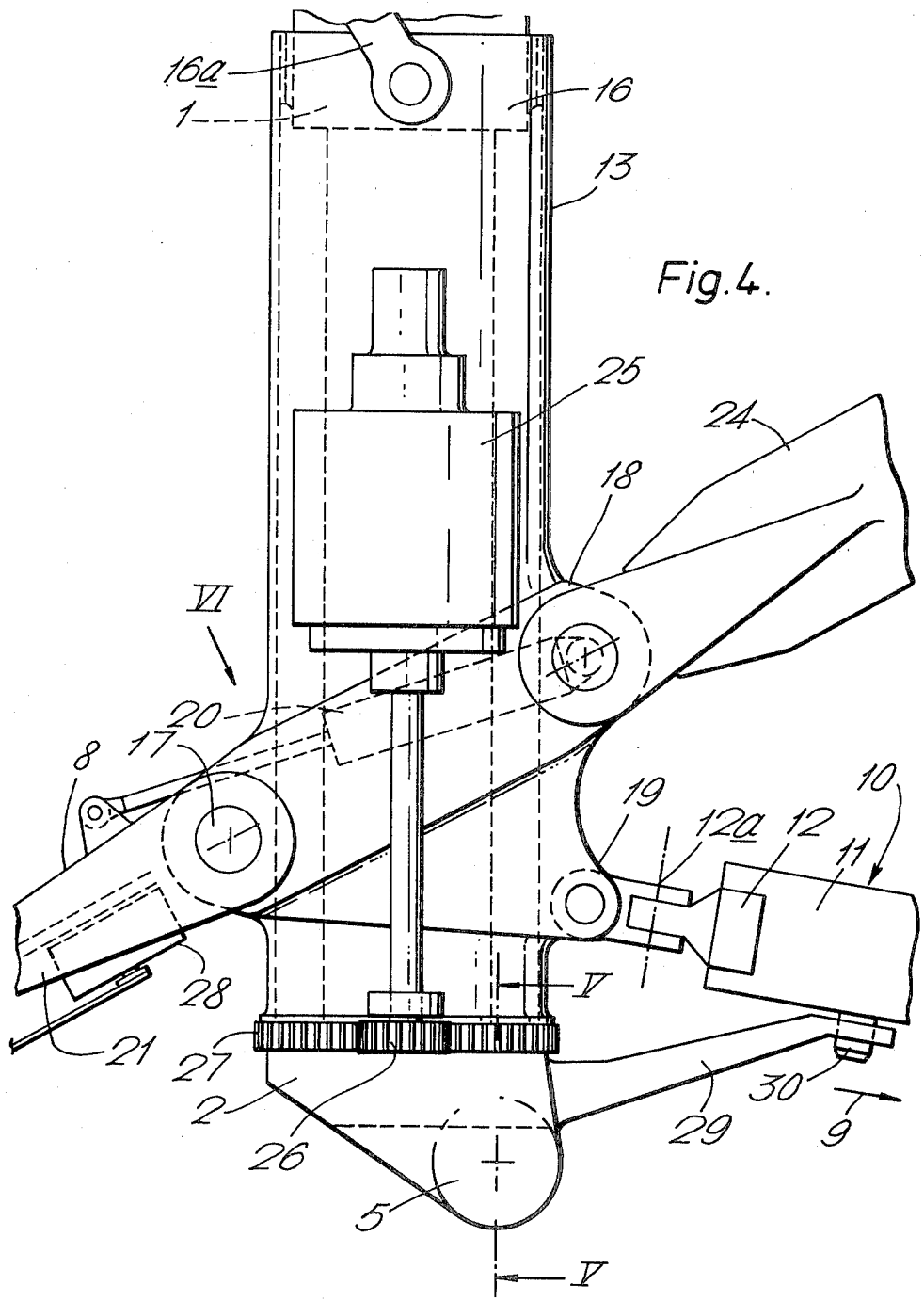
FIG. 4 is an enlarged view of that part of the undercarriage unit within box IV of FIG. 2.

The tension loads to be transmsitted result from those passed into the sleeve by the towing link 8 during launch and are of considerable magnitude; to provide a relatively direct load path, the lugs 17 and 18 are so disposed on the sleeve 13 that in a launch condition, for example that of FIG. 2, the towing link 8 and the transmitting element 24 are generally aligned with one another. Since the load transmitted between the lugs 17 and 18 is transmitted to each side of the lower leg member 2 by the walls of the sleeve, these walls are locally thickened in the diagonal region between the two lugs to prevent excessive stress build-up.

The rearward lower lug 19 has pivotally attached to it about a horizontal axis, the break-link element 12 of the hold back arrangement 10. The element 12, or rather a major portion thereof, after fracture remains attached to the lug 19, whilst the element 11 remains behind.

The break-link element 12 incorporates a pivot 12a having an axis normal to the pivot axis of the lug 19 to enable the hold back arrangement 10 to swing laterally during steering. This lateral swing is controlled in a manner to be described.

The lug 19 is so disposed with reference to the lug 17 that the hold back arrangement is generally aligned with both during the launch conditions of FIG. 2.

For steering purposes, as is usual with the nose unit of an undercarriage, the lower leg member 2 is rotatable with respect to the upper leg member 1. The sleeve 13 is fixed in this rotational sense with reference to the upper leg member 1 and accordingly it provides a convenient mounting for a steering motor 25. This effects steering, that is to say rotation of the lower leg member 2, by means of a transmission arrangement including a pinion gear 26 permanently engaged with an annular or part annular toothed rack 27 formed upon the lower leg member.

The towing link 8 is utilised to aid acquisition of the undercarriage unit by the shuttle 7. As before mentioned with reference to FIG. 7, the shuttle has acquisition members 7a which provide a guide-in effect when one or other is engaged by the shuttle engagement arm 23 of the towing link 8. Such engagement angularly deflects the arm 23 to one side or the other about its pivot 22, the deflection being used to signal, by signalling means 28 (FIG. 6), a steering demand to the motor 25 which causes the undercarriage unit to steer toward a shuttle straddling position.

The tension element 11 of the hold back arrangement 10 is fitted to the break-link element prior to the aircraft being moved to the launch region for engagement of its nose undercarriage unit with the catapult shuttle. The element 11 accordingly trails behind the nose unit. So that it is correctly orientated for engagement with the fixed structure irrespective of the orientation of the aircraft itself (the aircraft longitudinal axis may be angled to the catapult axis even though the wheels are correctly straddling the shuttle) a rearwardly extending steering arm 29 is mounted upon the lower leg member 2 to turn with it during steering. The arm terminates in a bifurcation between which protrudes a spigot 30 carried by the tension element 11. The latter is thus swung laterally about the pivot 12a in general alignment with the direction being steered by the ground wheels 6.

The sleeve 13, in addition to its load accepting and transmitting function and its mounting function for the steering motor, also provides convenient corrosion protection for the telescopic region of the lower leg member 2.

I claim:

1. An aircraft undercarriage unit which includes an upper leg member arranged to be attached to an aircraft structure, a lower leg member carrying ground wheel means being in axially slidable association with the upper leg member to form a telescopic shock absorber, a load transmitting sleeve member surrounding a portion of the lower leg member adjacent the ground wheel means and dimensioned so as to receive a lower portion of the upper leg member, and constraining means to locate the sleeve member with respect to the lower leg member and the upper leg member but which allow telescopic movement of the leg members, the sleeve member having anchorage means through which towing loads are accepted and transmitted.

2. An aircraft undercarriage unit according to claim 1, wherein the constraining means prevent rotation of the sleeve member with respect to the upper leg member.

3. An aircraft undercarriage as claimed in claims 1 or 2 wherein the lower leg member is in axially slidable and rotatable association with the upper leg member to allow rotation of the lower leg member with respect to the upper leg member for steering purposes.

4. An aircraft undercarriage unit according to claim 3, wherein the sleeve member forms a mounting for a steering motor.

5. An aircraft undercarriage unit according to claim 1 or 2 wherein the sleeve member is fixed axially with respect to the lower leg member.

6. An aircraft undercarriage unit according to claim 1, wherein the upper leg member and the lower leg member are capable of controlled extension from an unextended position to an extended position.

7. An aircraft undercarriage unit according to claim 5, wherein an upper end region of the sleeve member is in sealingly slidable engagement with the upper leg member.

8. An aircraft undercarriage unit according to claim 1, wherein the sleeve member further includes anchorage means through which restraint loads are transmitted.

9. An aircraft undercarriage unit according to claim 1, wherein the anchorage means include towing link means and drag strut means attached to the sleeve member through which at least the major portion of the towing loads are accepted and transmitted respectively, the lines of force through the towing link means and the drag strut means being coincident when a towing force is applied to the sleeve member.

* * * * *